US011151577B2

(12) United States Patent
Chan et al.

(10) Patent No.: US 11,151,577 B2
(45) Date of Patent: Oct. 19, 2021

(54) DYNAMICALLY SELECTING CONTACT CENTER WORKFLOWS BASED ON WORKFLOW INSIGHTS

(71) Applicant: ORACLE INTERNATIONAL CORPORATION, Redwood Shores, CA (US)

(72) Inventors: Victor Chung-Wai Chan, Saratoga, CA (US); W. Scott Seebauer, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 489 days.

(21) Appl. No.: 14/263,168

(22) Filed: Apr. 28, 2014

(65) Prior Publication Data

US 2015/0310445 A1     Oct. 29, 2015

(51) Int. Cl.
*G06Q 30/00*     (2012.01)
*G06Q 10/06*     (2012.01)

(52) U.S. Cl.
CPC ..... *G06Q 30/016* (2013.01); *G06Q 10/06316* (2013.01); *G06Q 10/0633* (2013.01); *G06Q 10/063114* (2013.01)

(58) Field of Classification Search
CPC ............ G06Q 30/16; G06Q 10/06316; G06Q 10/103; G06Q 10/0633; G06Q 10/63114
See application file for complete search history.

(56) References Cited

U.S. PATENT DOCUMENTS

| | | | | |
|---|---|---|---|---|
| 6,430,545 B1 * | 8/2002 | Honarvar | ............... | G06Q 10/06 706/47 |
| 6,601,034 B1 * | 7/2003 | Honarvar | ............... | G06Q 10/06 705/7.36 |
| 6,614,903 B1 * | 9/2003 | Flockhart | ............... | G06Q 10/06 379/265.06 |
| 6,684,192 B2 * | 1/2004 | Honarvar | ............... | G06Q 10/06 705/7.31 |
| 7,136,865 B1 * | 11/2006 | Ra | .................. | G06F 9/4443 |
| 7,170,993 B2 * | 1/2007 | Anderson | .............. | G06Q 30/02 379/219 |
| 7,580,862 B1 * | 8/2009 | Montelo | ................ | G06Q 10/10 705/26.1 |
| 7,729,948 B1 * | 6/2010 | Gailloux | ................ | G06Q 10/06 455/406 |
| 9,459,764 B1 * | 10/2016 | Rosner | ................. | G06F 3/0482 |

(Continued)

*Primary Examiner* — Matthew S Gart
*Assistant Examiner* — Stephen S Swartz
(74) *Attorney, Agent, or Firm* — Kraguljac Law Group, LLC

(57) ABSTRACT

Embodiments of the invention provide systems and methods for managing workflows in a contact center. More specifically, embodiments of the present invention are directed to dynamically influencing workflows based on learned insights into those workflows. With end-to-end Customer Relationship Management (CRM) suites, which manage the entire customer service journey from consumer website to knowledge base to escalation to a live agent via a communication channel to incident creation and incident resolution, it is possible to provide an out-of-the-box, simple-to-use solution to the above problems that offers unique advantages over the expensive, custom, bolt-on solutions.

20 Claims, 7 Drawing Sheets

(56) References Cited

U.S. PATENT DOCUMENTS

| | | | | |
|---|---|---|---|---|
| 2002/0140731 | A1* | 10/2002 | Subramaniam | G06F 3/0481 715/762 |
| 2003/0083923 | A1* | 5/2003 | Guicciardi | G06Q 10/10 705/300 |
| 2003/0086422 | A1* | 5/2003 | Klinker | H04L 29/06 370/389 |
| 2005/0002515 | A1* | 1/2005 | Mewhinney | H04M 3/5158 379/266.08 |
| 2006/0053106 | A1* | 3/2006 | Bhaghavan | G06Q 10/06 |
| 2006/0143116 | A1* | 6/2006 | Sumner | G06Q 10/10 705/317 |
| 2006/0262922 | A1* | 11/2006 | Margulies | G06Q 30/02 379/265.12 |
| 2007/0038499 | A1* | 2/2007 | Margulies | G06Q 10/06 705/7.26 |
| 2011/0211687 | A1* | 9/2011 | Bethea | H04M 3/493 379/266.07 |
| 2012/0054095 | A1* | 3/2012 | Lesandro | G06Q 20/10 705/39 |
| 2012/0166244 | A1* | 6/2012 | Raj | G06Q 30/016 705/7.13 |
| 2012/0296691 | A1* | 11/2012 | Ethier | G06Q 10/0633 705/7.27 |
| 2013/0080362 | A1* | 3/2013 | Chang | G06Q 30/0255 706/21 |
| 2013/0223608 | A1* | 8/2013 | Flockhart | H04M 3/5158 379/265.1 |
| 2013/0282417 | A1* | 10/2013 | Gaedcke | G06Q 30/016 705/7.13 |
| 2013/0282550 | A1* | 10/2013 | Sycoff | G06Q 40/04 705/37 |
| 2015/0106129 | A1* | 4/2015 | Kinney | G06Q 40/08 705/4 |

* cited by examiner

DYNAMICALLY SELECTING CONTACT CENTER WORKFLOWS BASED ON WORKFLOW INSIGHTS

BACKGROUND OF THE INVENTION

Embodiments of the present invention relate generally to methods and systems for managing workflows in a contact center and more particularly to dynamically influencing workflows based on learned insights into those workflows.

Customer Relationship Management (CRM) systems or other contact center systems provide support for customers of a product or service by allowing those users to make requests for service that can include a question posed by the user related to the product or service. Generally speaking, these systems receive requests for service, e.g., in the form of a phone call, web page form, instant message, email, etc., and route the requests to a human agent for addressing the request and providing an answer to the question. In ideal cases, the agent is selected based on the topic of the question or request and a predefined profile of that agent that includes indications of the agent's skills and/or expertise. This selection process, steps and processes to be performed by that agent, as well as numerous other processes performed by the contact center are defined in and controlled by any number of different workflows.

Contact Centers strive to provide the best customer experience at the lowest cost by encapsulating best practices into their contact center workflows. The workflows can be consumer-facing (e.g. a web self-service application) or agent-facing (e.g. a simple script or a complex workflow that guides the agent). These workflows work well for known problems with known solutions. To address emerging issues, state-of-the-art solutions are using analytics to recommend the "next best action" for the consumer or for the agent. However, these custom solutions are extremely complex and require extensive professional services to define and maintain. Hence, there is a need for improved methods and systems for managing workflows in a contact center.

BRIEF SUMMARY OF THE INVENTION

Embodiments of the invention provide systems and methods for dynamically influencing workflows based on learned insights into those workflows. According to one embodiment, dynamically influencing workflows in a contact center based on accumulated workflow insights can comprise learning a plurality of paths through each of a plurality of workflows executed by a Customer Relationship Management (CRM) system. Learning the plurality of paths can include learning a likelihood of a successful outcome for each of one or more decision points in each of the plurality of workflows. More specifically, learning the plurality of paths through each of the plurality of workflows can comprise executing one or more of the workflows, logging an execution path through the executed one or more workflows, wherein logging the execution path includes storing an indication of a branch selected at each of the one or more decision points in the workflow and one or more performance metrics for each decision point, and correlating each decision point in the logged execution paths of the executed one or more workflows with a likelihood of a successful outcome based on the logged performance metrics.

One or more of the plurality of workflows can be dynamically selected in response to a customer contact. The one or more workflows can be selected based on the learned likelihood of a successful outcome for the decision points in the workflows. More specifically, dynamically selecting the one or more of the plurality of workflows in response to the customer contact can comprise receiving the customer contact, determining an intent of the received customer contact, and selecting the one or more of the plurality of workflows in response to the received customer contact based on the correlation of each decision point in the workflow with a successful outcome for the determined intent of the received customer contact. Selecting the one or more of the plurality of workflows in response to the received customer contact can comprise, for example, executing a workflow to select the one or more of the plurality of workflows based on the correlation of each decision point in the workflow with a successful outcome for the determined intent of the received customer contact.

For example, selecting the one or more of the plurality of workflows in response to the received customer contact based on the correlation of each decision point in the workflow with a successful outcome for the determined intent of the received customer contact can comprise providing to a customer making the customer contact the correlation of one or more decision points in the workflow with a successful outcome for the determined intent and receiving an indication of the selected one or more of the plurality of workflows from the customer. Providing to the customer making the customer contact the correlation of one or more decision points in the workflow with a successful outcome for the determined intent can comprise. For example, providing a graphical representation of a decision tree representing the decision points in the workflows and an indication of the correlation of the decision points with the successful outcome for the determined intent.

In another example, selecting the one or more of the plurality of workflows in response to the received customer contact based on the correlation of each decision point in the workflow with a successful outcome for the determined intent of the received customer contact can comprise providing to an agent handling the customer contact the correlation of one or more decision points in the workflow with a successful outcome for the determined intent and receiving an indication of the selected one or more of the plurality of workflows from the agent.

Providing to the agent handling the customer contact the correlation of one or more decision points in the workflow with a successful outcome for the determined intent can comprise, for example, providing a graphical representation of a decision tree representing the decision points in the workflows and an indication of the correlation of the decision points with the successful outcome for the determined intent.

DETAILED DESCRIPTION OF THE INVENTION

Figure 1:
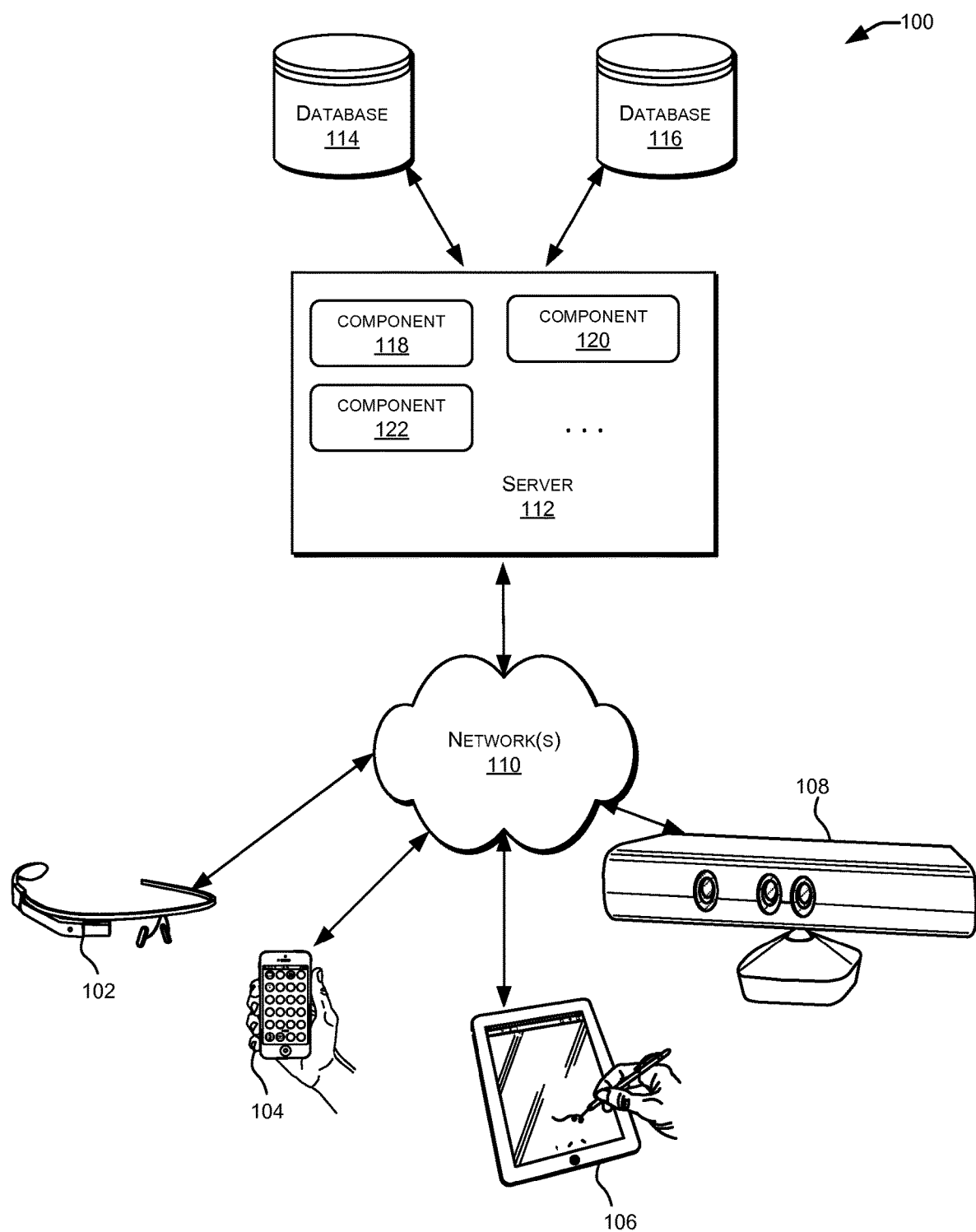
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for managing workflows in a contact center. More specifically, embodiments of the present invention are directed to dynamically influencing workflows based on learned insights into those workflows. With end-to-end Customer Relationship Management (CRM) suites, which manage the entire customer service journey from consumer website to knowledge base to escalation to a live agent via a communication channel to incident creation and incident resolution, it is possible to provide an out-of-the-box, simple-to-use solution to the above problems that offers unique advantages over the expensive, custom, bolt-on solutions.

To do so, embodiments of the present invention collect performance metrics for decision points across workflow snippets handling a customer journey, process those metrics into insights into the success rate of each decision relative to different customer intents, and allow the workflows to use those insights to guide the customer/agent down the most successful path. Unlike custom solutions that require extensive professional services and software add-on's that must be integrated with the customer/agent-facing workflow application, embodiments of the present invention provide a set of centralized workflow insight services that facilitate the easy incorporation of workflow insight logic into the various workflows within the CRM system to achieve an inexpensive, out-of-the-box solution that is much simpler to use and maintain.

Dynamic workflows based on workflow insights can direct consumers to next best action to best meet their intent. For example, if there is an available self-service procedure that has a high success rate, the consumer can be guided to that procedure. However, if there is no self-service procedure that has a good success rate, then the workflow could provide the help of a live agent to the consumer. Similarly, the workflow could guide the consumer toward the channel with the highest success rate and/or shortest handle time. Dynamically influencing workflows in this way can be highly reliable because the metrics used in workflow selection can be calculated from actual outcomes of those workflows. Additionally, since the workflow insight capabilities are part of the workflow fabric, when a workflow is added, deleted, or updated there is no separate complex analytics system to update and keep synchronized. Similarly, when new intents are added to the system (to support the introduction of new products or services offerings) the new intents are automatically incorporated into the workflow insights. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108.

Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
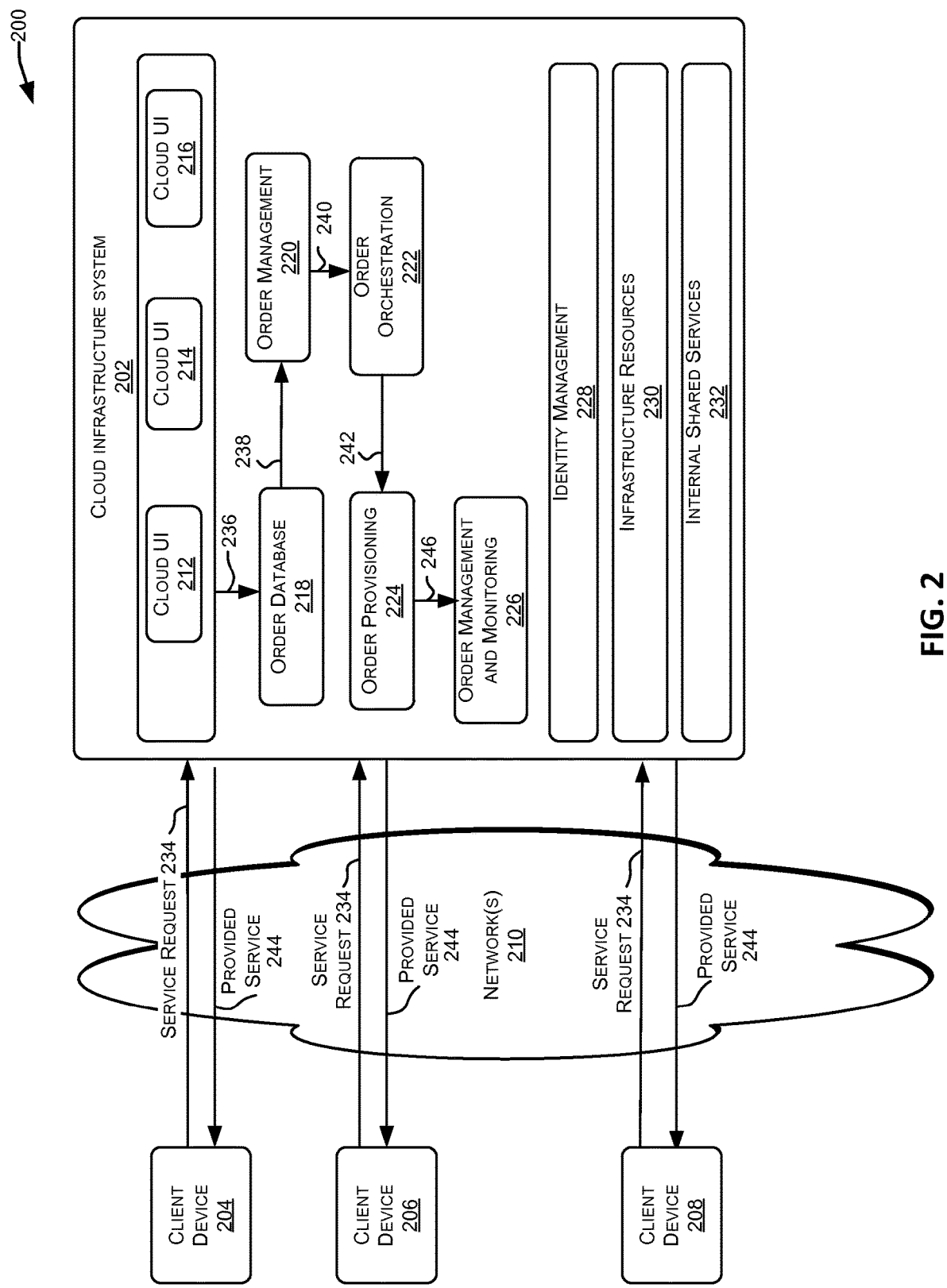
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
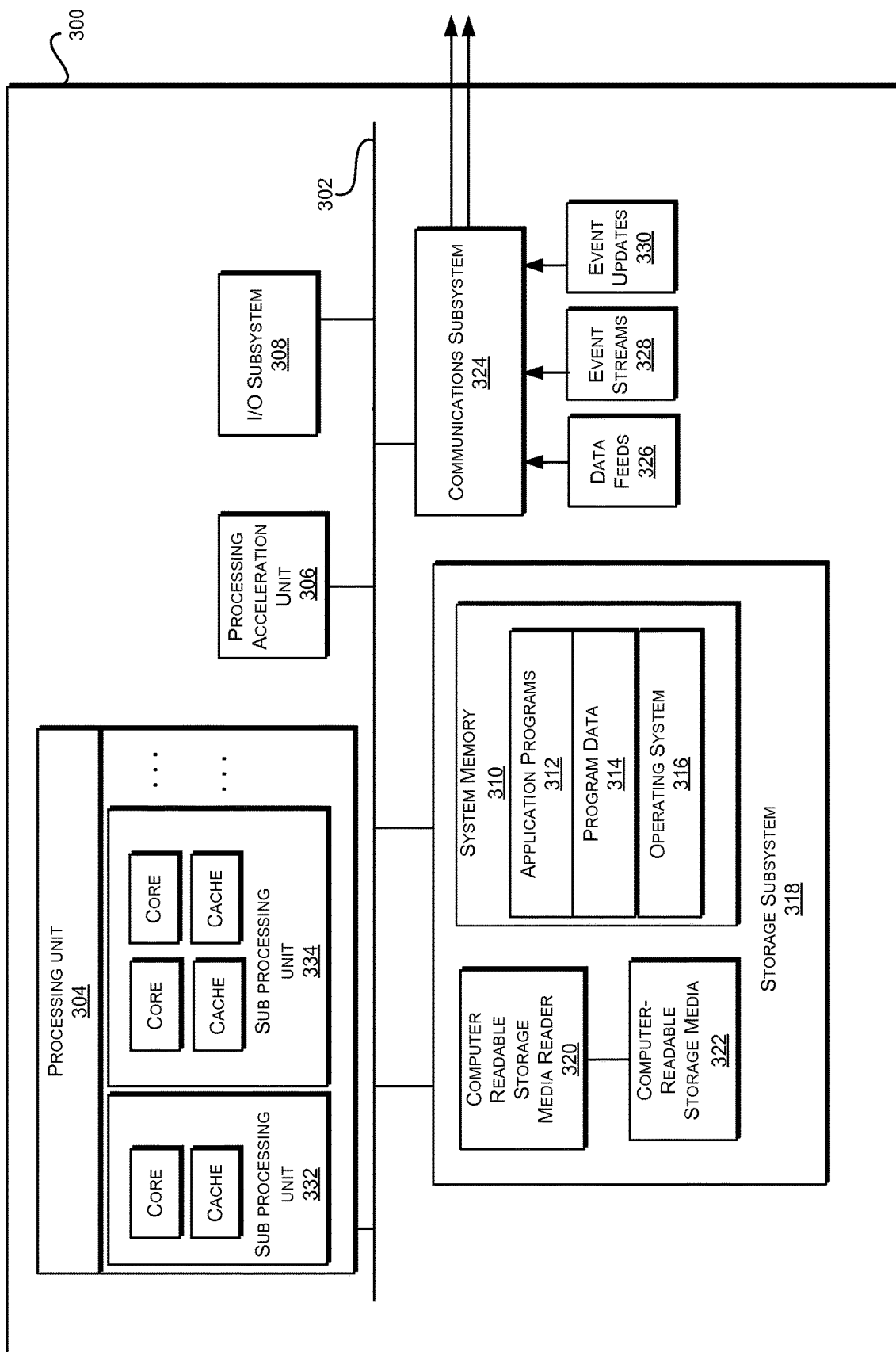
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
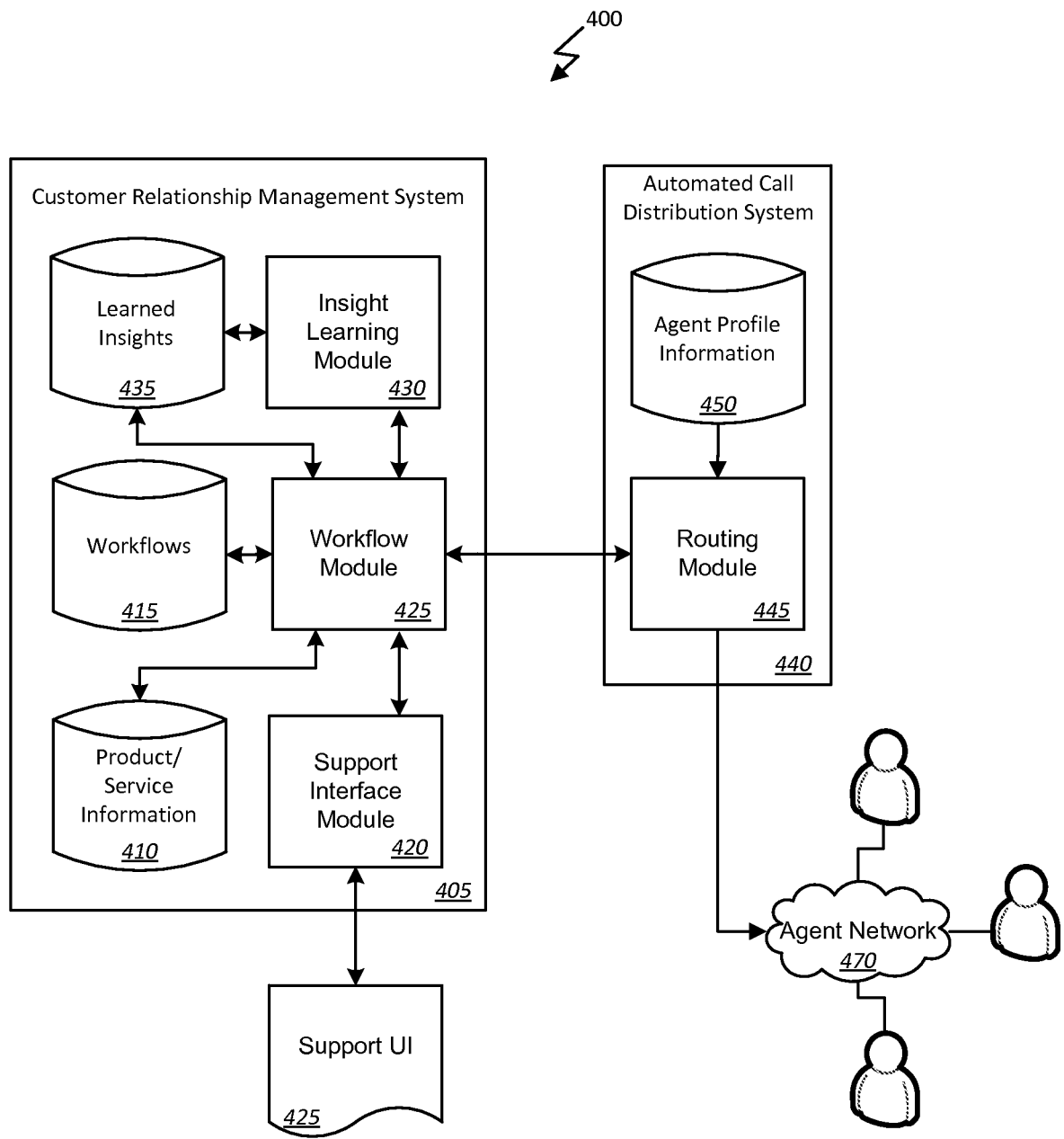
FIG. 4 is a block diagram illustrating, at a high-level, functional components of a system for dynamically influencing workflows in a contact center based on accumulated workflow insights according to one embodiment of the present invention.

FIG. 4 is a block diagram illustrating, at a high-level, functional components of a system for dynamically influencing workflows in a contact center based on accumulated workflow insights according to one embodiment of the present invention. In this example, the system 400 includes a Customer Relationship Management (CRM) system 405 such as may be executed on a server or another computer or computing device as described above. The CRM system 405 can include information 410 for products and/or services supported by the CRM system 405. The CRM system 405 can also include a set of information defining any number of workflows 415. Generally speaking, these workflows 415 can comprise scripts for, guiding a customer contact attempting to find information or troubleshoot a problem, selecting and/or guiding a customer service agent through performing troubleshooting, or other actions of the CRM system 405.

The CRM system 405 can support a number of users, such as end users of a product or service, can receive requests for support or service from those users, and process those requests in order to direct the user to appropriate product or service information 410 and/or connect or direct the requesting users to one or more agents 470 for answers to questions posed in the requests. For example, a support interface module 425 of the CRM system 405 can provide one or more interfaces 425 including but not limited to web pages, email addresses, phone lines, chat and/or instant messaging, and/or any of a variety of other communication channels to customer users of the system 400. Through these channels/interfaces 425, the customers can access information and/or make requests for support that may include questions to be answered by the agents 470.

Once received, these requests and/or customer contacts can be evaluated by the workflow module 425 based on the product information 410, for example, to select an agent workflow 415. That is, for a particular product and issue that is the subject of the request or contact, a workflow to be performed, e.g., to troubleshoot a problem, obtain more information, etc., can be selected for performance by a customer service agent. The product information, selected workflow and other information received with the request can be forwarded to a routing module 445 of an Automated Call Distribution (ACD) system 440 which can then direct the request or contact to a selected agent 470 with matching expertise. That is, the routing module 445 can identify an agent with a skillset defined in agent profile information 450 that is appropriate for the nature of the contact and then connect the customer with that agent through email, phone, chat and/or instant messaging, and/or any of a variety of other communication channels. It should be noted that while illustrated here as separate from the CRM system 405, the ACD system 440 and/or routing module 445 and other components thereof may, in other implementations, be part of the CRM system 405 without departing from the scope of the present invention.

As noted above, embodiments of the present invention are directed to dynamically influencing workflows based on learned insights into those workflows. With end-to-end Customer Relationship Management (CRM) suites, which manage the entire customer service journey from consumer website to knowledge base to escalation to a live agent via a communication channel to incident creation and incident resolution, it is possible to provide an out-of-the-box, simple-to-use solution to the above problems that offers unique advantages over the expensive, custom, bolt-on solutions. To do so, an insight learning module 430 of the CRM system 405 can collect performance metrics for decision points across workflow snippets handling a customer journey, process those metrics into insights into the success rate of each decision relative to different customer intents, and store that information is a set of learned insights 435. The workflow module 425 can then use those stored insights 435 to guide the customer/agent down the most successful path.

More specifically, decision points in the various workflows 415 can be instrumented to gather performance data. In this way, a set of decision point metrics (DPM) can be created to capture the success rate of that decision point relative to the customer's intent. During the customer journey, each decision point in the instrumented workflows 435 can be tracked by the insight learning module 430, forming a decision path. At the resolution of each incident, the outcome can be measured and captured by the insight learning module 430 in a set of outcome metrics (OM). At the conclusion of each customer journey, the OM can be used by the insight learning module 430 to update the DPM along the decision path. Thus, the workflows are enhanced giving the workflow module 425 the capability to leverage the DPM at each decision point, either by informing the user with a score (calculated based on the DPM) for each decision choice, or by guiding the user down the most successful path. So in summary, the insight learning module 430 can capture the decisions that are being taken in workflows, track the complete decision path for each customer journey, calculate and store the outcome metrics for each customer journey (e.g. handle time, first contact resolution (or not), transfer required (or not), customer satisfaction survey score), 4) tabulate DPM's for each decision point relative to each intent (can use the same set of metrics as above, but averaged across last N customer journeys for each intent), and allow the workflow and workflow module 425 to consume the DPM's at run-time to optimize success rates.

Stated another way, dynamically influencing workflows 415 in the CRM system 405 by the workflow module 425 based on accumulated, learned workflow insights 435 can comprise the insight learning module 430 learning a plurality of paths through each of a plurality of workflows 415 executed by the CRM system 405. Generally speaking, learning the plurality of paths can include learning, by the insight learning module 430 a likelihood of a successful outcome for each of one or more decision points in each of the plurality of workflows 415. More specifically, learning the paths through each of the plurality of workflows 415 can comprise the workflow module executing one or more of the instrumented workflows 415 and the indigent learning module 430 logging an execution path through the executed one or more workflows 415. Logging the execution path can include storing, by the insight learning module 430, an indication of a branch selected at each of the one or more decision points in the workflow and one or more performance metrics for each decision point. Such metrics can include, for example, a length of time required, results of an action, resolution of and issue (or not), etc. Each decision point in the logged execution paths of the executed one or more workflows 415 can then be correlated by the insight learning module 430 with a likelihood of a successful outcome based on the logged performance metrics. That is, each decision point can be assigned by the insight learning module 430 a percentage, probability, score, or other indication of likelihood that each branch of that point will or can lead to a successful or satisfactory resolution of a customer contact with a particular intent.

Dynamically influencing workflows in the CRM system 405 based on accumulated workflow insights 435 can further comprise the workflow module 425 dynamically selecting one or more of the plurality of workflows 415 in response to a customer contact. Generally speaking, the one or more workflows 415 can be selected based on the learned likelihood of a successful outcome for the decision points in the workflows 415. More specifically, dynamically selecting one or more of the plurality of workflows in response to the customer contact can comprise receiving the customer contact through the support interface module 420 and support user interface 425, determining by the support interface module 420 and/or workflow module 425 an intent of the received customer contact, and selecting by the workflow module 425 the one or more workflows 415 in response to the received customer contact based on the correlation of each decision point in the workflow with a successful outcome stored in the learned insights 435 for the determined intent of the received customer contact.

Selecting the one or more workflows in response to the received customer contact based on the correlation of each decision point in the workflow with a successful outcome for the determined intent of the received customer contact can comprise, for example, providing through the support interface module 420 and support user interface 425 to a customer making the customer contact the correlation of one or more decision points in the workflow with a successful outcome for the determined intent. In another example, the correlation of one or more decision points in the workflow with a successful outcome for the determined intent might be provided by through the routing module 445 and agent interface (not shown here) to the agent 470 handling the customer contact (if any). In yet another example, selecting the one or more workflows in response to the received customer contact can comprise the workflow module 425 executing a workflow to select the one or more of the plurality of workflows based on the correlation of each decision point in the workflow with a successful outcome for the determined intent of the received customer contact. Other variations are contemplated and considered to be within the scope of the present invention.

Figure 5:
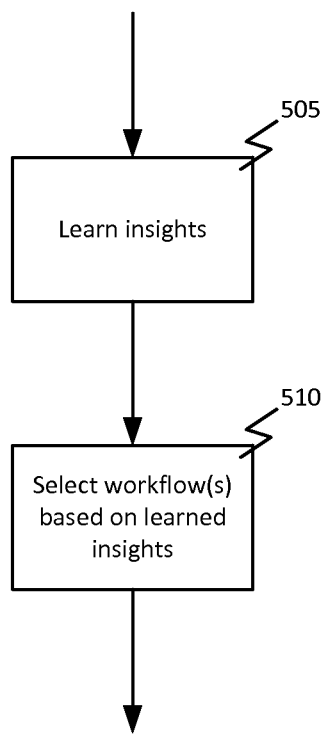
FIG. 5 is a flowchart illustrating a process for dynamically influencing workflows in a contact center based on accumulated workflow insights according to one embodiment of the present invention.

FIG. 5 is a flowchart illustrating a process for dynamically influencing workflows in a contact center based on accumulated workflow insights according to one embodiment of the present invention. As illustrated in this example, dynamically influencing workflows in a contact center based on accumulated workflow insights can comprise learning 505 a plurality of paths through each of a plurality of workflows executed by the CRM system. Generally speaking, learning 505 the plurality of paths can include learning a likelihood of a successful outcome for each of one or more decision points in each of the plurality of workflows. Additional details of an exemplary process for learning 505 the plurality of paths through the workflows will be described below with reference to FIG. 6. Dynamically influencing workflows in a contact center based on accumulated workflow insights can further comprise dynamically selecting 510 one or more of the plurality of workflows in response to a customer contact. Generally speaking, the one or more workflows can be selected based on the learned likelihood of a successful outcome for the decision points in the workflows. Additional details of an exemplary process for dynamically selecting 510 one or more of the plurality of workflows in response to a customer contact will be described below with reference to FIG. 7.

Figure 6:
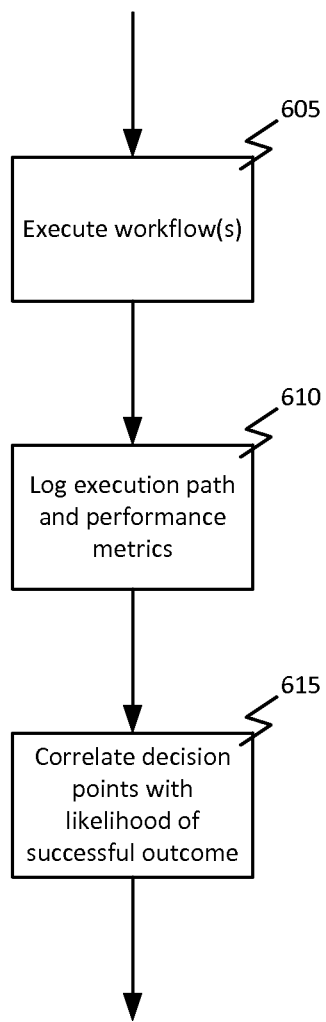
FIG. 6 is a flowchart illustrating additional details of a process for learning paths through each of a plurality of workflows according to one embodiment of the present invention.

FIG. 6 is a flowchart illustrating additional details of a process for learning paths through each of a plurality of workflows according to one embodiment of the present invention. As illustrated in this example, learning the paths through each of the plurality of workflows can comprise executing 605 one or more of the workflows and logging 610 an execution path through the executed one or more workflows. Logging 610 the execution path can include storing an indication of a branch selected at each of the one or more decision points in the workflow and one or more performance metrics for each decision point. Such metrics can include, for example, a length of time required, results of an action, resolution of and issue (or not), etc. Each decision point in the logged execution paths of the executed one or more workflows can then be correlated 615 with a likelihood of a successful outcome based on the logged performance metrics. That is, each decision point can be assigned a percentage, probability, score, or other indication of likelihood that each branch of that point will or can lead to a successful or satisfactory resolution of a customer contact with a particular intent.

Figure 7:
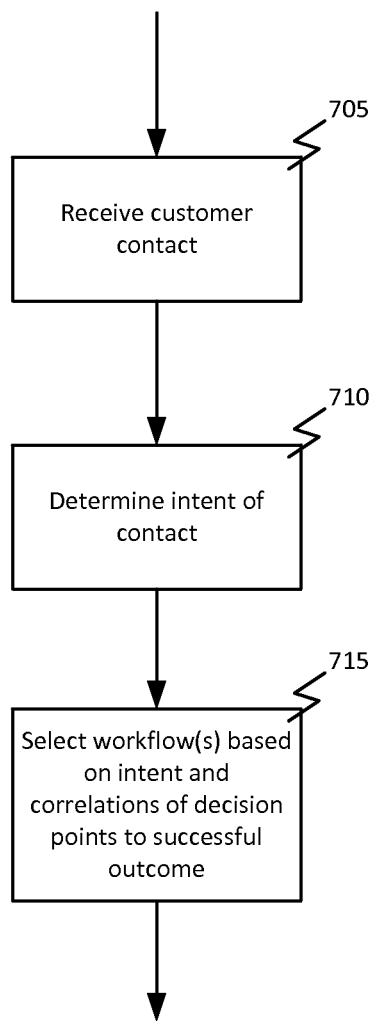
FIG. 7 is a flowchart illustrating additional details of a process for selecting one or more workflows in response to a customer contact according to one embodiment of the present invention.

FIG. 7 is a flowchart illustrating additional details of a process for selecting one or more workflows in response to a customer contact according to one embodiment of the present invention. As illustrated in this example, dynamically selecting one or more of the plurality of workflows in response to the customer contact can comprise receiving 705 the customer contact, determining 710 an intent of the received customer contact, and selecting 715 the one or more workflows in response to the received customer contact based on the correlation of each decision point in the workflow with a successful outcome for the determined intent of the received customer contact.

For example, selecting 715 the one or more workflows in response to the received customer contact based on the correlation of each decision point in the workflow with a successful outcome for the determined intent of the received customer contact can comprise providing to a customer making the customer contact the correlation of one or more decision points in the workflow with a successful outcome for the determined intent and receiving an indication of the selected one or more of the plurality of workflows from the customer.

Providing to the customer making the customer contact the correlation of one or more decision points in the workflow with a successful outcome for the determined intent can comprise, in some cases, providing a graphical representation of a decision tree representing the decision points in the workflows and an indication of the correlation of the decision points with the successful outcome for the determined intent.

In another example, selecting 715 the one or more workflows in response to the received customer contact based on the correlation of each decision point in the workflow with a successful outcome for the determined intent of the received customer contact can comprise providing to an agent handling the customer contact the correlation of one or more decision points in the workflow with a successful outcome for the determined intent and receiving an indication of the selected one or more of the plurality of workflows from the agent. In some cases, providing to the agent handling the customer contact the correlation of one or more decision points in the workflow with a successful outcome for the determined intent can comprise providing a graphical representation of a decision tree representing the decision points in the workflows and an indication of the correlation of the decision points with the successful outcome for the determined intent.

In yet another example, selecting 715 the one or more workflows in response to the received customer contact can comprise executing a workflow to select the one or more of the plurality of workflows based on the correlation of each decision point in the workflow with a successful outcome for the determined intent of the received customer contact.

It should be noted that selecting 715 a workflow can occur at a variety of different times and perhaps more than once while handling a given contact depending upon the exact implementation. For example, selecting 715 a workflow can be performed when selecting the agent and assigning the contact to that agent's queue. In another example, selecting 715 a workflow can be performed when the agent initiates handling of the customer contact. In yet another example, selecting 715 a workflow can be performed while the agent is handling the customer contact, i.e., when one workflow being executed triggers selection of another workflow. Further still some combination of these possibilities are possible. Other variations, depending upon the exact implementation, are contemplated and considered to be within the scope of the present invention.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for dynamically influencing workflows in a contact center based on accumulated workflow insights, the method comprising:
   learning, by a Customer Relationship Management (CRM) system, a plurality of paths through each of a plurality of workflows executed by the CRM system, the learning comprising:
      tracking each of a plurality of customer journeys, each customer journey taking a path of the plurality of paths, the tracking comprising:
         identifying an intent of the customer journey related to a product or service,
         identifying each decision point in one or more workflows in the plurality of workflows executed in the path taken during the customer journey, each decision point having a plurality of associated branches and a selected branch for the path,
         at a resolution of the customer journey, generating an outcome metric for the path taken during the customer journey to achieve the resolution, wherein the outcome metric indicates a level of success of the path relative to the intent of the customer journey,
      calculating a decision point metric for each selected branch at each decision point in the one or more workflows executed in the path taken to achieve the resolution, wherein the decision point metric is calculated based on the outcome metric for the path, and indicates a likelihood that the selected branch will lead to the resolution, and
      updating, for each decision point in the one or more workflows executed in the path taken to achieve the resolution, an intent decision point metric based on the calculated decision point metric for the decision point and the intent of the customer journey, wherein the intent decision point metric indicates a probability that the selected branch will lead to the resolution for the intent identified for the customer journey;
   dynamically selecting during run-time, by the CRM system, one or more of the plurality of workflows in response to a customer contact based at least in part on:
      determining an intent of the customer contact, and
      determining a correlation of each decision point in the one or more workflows with a successful outcome for the intent of the customer contact based at least in part on the intent decision point metrics for each decision point in the one or more workflows; and
   executing, by the CRM system, the dynamically selected one or more of the plurality of workflows.

2. The method of claim 1, wherein generating an outcome metric for the path taken comprises:
   storing an indication of the selected branch at each decision point in the path and one or more performance metrics for each decision point.

3. The method of claim 2, wherein dynamically selecting the one or more of the plurality of workflows in response to the customer contact comprises:
   receiving the customer contact; and
   selecting the one or more of the plurality of workflows in response to the received customer contact having the highest correlation of each decision point in the workflow with a successful outcome for the determined intent of the received customer contact.

4. The method of claim 2, wherein dynamically selecting the one or more of the plurality of workflows in response to the customer contact comprises:
receiving the customer contact; and
selecting the one or more of the plurality of workflows in response to the received customer contact based on the correlation of each decision point in the workflow with a successful outcome for the determined intent of the received customer contact, wherein the selecting comprises:
providing, to a customer making the customer contact, the correlation of one or more decision points in the workflow with a successful outcome for the determined intent; and
receiving an indication of the selected one or more of the plurality of workflows from the customer.

5. The method of claim 4, wherein providing to the customer making the customer contact the correlation of one or more decision points in the workflow with a successful outcome for the determined intent comprises providing a graphical representation of a decision tree representing the decision points in the workflows and an indication of the correlation of the decision points with the successful outcome for the determined intent.

6. The method of claim 4, wherein selecting the one or more of the plurality of workflows in response to the received customer contact based on the correlation of each decision point in the workflow with a successful outcome for the determined intent of the received customer contact further comprises:
providing, to an agent handling the customer contact, the correlation of one or more decision points in the workflow with a successful outcome for the determined intent; and
receiving an indication of the selected one or more of the plurality of workflows from the agent.

7. The method of claim 6, wherein providing to the agent handling the customer contact the correlation of one or more decision points in the workflow with a successful outcome for the determined intent comprises providing a graphical representation of a decision tree representing the decision points in the workflows and an indication of the correlation of the decision points with the successful outcome for the determined intent.

8. The method of claim 4, wherein selecting the one or more of the plurality of workflows in response to the received customer contact comprises executing a workflow to select the one or more of the plurality of workflows based on the correlation of each decision point in the workflow with a successful outcome for the determined intent of the received customer contact.

9. A system comprising:
a processor; and
a memory coupled with and readable by the processor and storing therein a set of instructions which, when executed by the processor, causes the processor to dynamically influence workflows in a contact center based on accumulated workflow insights by:
learning a plurality of paths through each of a plurality of workflows executed by a Customer Relationship Management (CRM) system, the learning comprising:
tracking each of a plurality of customer journeys, each customer journey taking a path of the plurality of paths, the tracking comprising:
identifying an intent of the customer journey related to a product or service,
identifying each decision point in one or more workflows in the plurality of workflows executed in the path taken during the customer journey, each decision point having a plurality of associated branches and a selected branch for the path,
at a resolution of the customer journey, generating an outcome metric for the path taken during the customer journey to achieve the resolution, wherein the outcome metric indicates a level of success of the path relative to the intent of the customer journey,
calculating a decision point metric for each selected branch at each decision point in the one or more workflows executed in the path taken to achieve the resolution, wherein the decision point metric is calculated based on the outcome metric for the path, and indicates a likelihood that the selected branch will lead to the resolution, and
updating, for each decision point in the one or more workflows executed in the path taken to achieve the resolution, an intent decision point metric based on the calculated decision point metric for the decision point and the intent of the customer journey, wherein the intent decision point metric indicates a probability that the selected branch will lead to the resolution for the intent identified for the customer journey;
dynamically selecting during run-time one or more of the plurality of workflows in response to a customer contact based at least in part on:
determining an intent of the customer contact, and
determining a correlation of each decision point in the one or more workflows with a successful outcome for the intent of the customer contact based at least in part on the intent decision point metrics for each decision point in the one or more workflows; and
executing the dynamically selected one or more of the plurality of workflows.

10. The system of claim 9, wherein generating an outcome metric for the path taken comprises:
storing an indication of the selected branch selected at each decision point in the path and one or more performance metrics for each decision point.

11. The system of claim 10, wherein dynamically selecting the one or more of the plurality of workflows in response to the customer contact comprises:
receiving the customer contact; and
selecting the one or more of the plurality of workflows in response to the received customer contact having the highest correlation of each decision point in the workflow with a successful outcome for the determined intent of the received customer contact.

12. The system of claim 10, wherein dynamically selecting the one or more of the plurality of workflows in response to the customer contact comprises:
receiving the customer contact; and
selecting the one or more of the plurality of workflows in response to the received customer contact based on the correlation of each decision point in the workflow with a successful outcome for the determined intent of the received customer contact, wherein the selecting comprises:

providing to a customer making the customer contact the correlation of one or more decision points in the workflow with a successful outcome for the determined intent, wherein providing to the customer making the customer contact the correlation of one or more decision points in the workflow with a successful outcome for the determined intent comprises providing a graphical representation of a decision tree representing the decision points in the workflows and an indication of the correlation of the decision points with the successful outcome for the determined intent; and receiving an indication of the selected one or more of the plurality of workflows from the customer.

13. The system of claim 12, wherein selecting the one or more of the plurality of workflows in response to the received customer contact based on the correlation of each decision point in the workflow with a successful outcome for the determined intent of the received customer contact further comprises:

providing, to an agent handling the customer contact, the correlation of one or more decision points in the workflow with a successful outcome for the determined intent, wherein providing to the agent handling the customer contact the correlation of one or more decision points in the workflow with a successful outcome for the determined intent comprises providing a graphical representation of a decision tree representing the decision points in the workflows and an indication of the correlation of the decision points with the successful outcome for the determined intent; and receiving an indication of the selected one or more of the plurality of workflows from the agent.

14. The system of claim 12, wherein selecting the one or more of the plurality of workflows in response to the received customer contact comprises executing a workflow to select the one or more of the plurality of workflows based on the correlation of each decision point in the workflow with a successful outcome for the determined intent of the received customer contact.

15. A non-transitory, computer-readable memory comprising a set of instructions stored therein which, when executed by a processor, causes the processor to dynamically influence workflows in a contact center based on accumulated workflow insights by:

learning a plurality of paths through each of a plurality of workflows executed by a Customer Relationship Management (CRM) system, the learning comprising:
tracking each of a plurality of customer journeys, each customer journey taking a path of the plurality of paths, the tracking comprising:
identifying an intent of the customer journey related to a product or service,
identifying each decision point in one or more workflows in the plurality of workflows executed in the path taken during the customer journey, each decision point having a plurality of associated branches and a selected branch for the path,
at a resolution of the customer journey, generating an outcome metric for the path taken during the customer journey to achieve the resolution, wherein the outcome metric indicates a level of success of the path,
calculating a decision point metric for each selected branch at each decision point in the one or more workflows executed in the path taken to achieve the resolution, wherein the decision point metric is calculated based on the outcome metric for the path, and indicates a likelihood that the selected branch will lead to the resolution, and
updating, for each decision point in the one or more workflows executed in the path taken to achieve the resolution, an intent decision point metric based on the calculated decision point metric for the decision point and the intent of the customer journey, wherein the intent decision point metric indicates a probability that the selected branch will lead to the resolution for the intent identified for the customer journey;

dynamically selecting during run-time one or more of the plurality of workflows in response to a customer contact based at least in part on:
determining an intent of the customer contact, and
determining a correlation of each decision point in the one or more workflows with a successful outcome for the intent of the customer contact based at least in part on the intent decision point metrics for each decision point in the one or more workflows; and
executing the dynamically selected one or more of the plurality of workflows.

16. The non-transitory, computer-readable memory of claim 15, wherein generating an outcome metric for the path taken comprises:

storing an indication of the selected branch selected at each decision point in the path and one or more performance metrics for each decision point.

17. The non-transitory, computer-readable memory of claim 16, wherein dynamically selecting the one or more of the plurality of workflows in response to the customer contact comprises:

receiving the customer contact; and
selecting the one or more of the plurality of workflows in response to the received customer contact having the highest correlation of each decision point in the workflow with a successful outcome for the determined intent of the received customer contact.

18. The non-transitory, computer-readable memory of claim 16, wherein dynamically selecting the one or more of the plurality of workflows in response to the customer contact comprises:

receiving the customer contact; and
selecting the one or more of the plurality of workflows in response to the received customer contact based on the correlation of each decision point in the workflow with a successful outcome for the determined intent of the received customer contact, wherein the selecting comprises:
providing to a customer making the customer contact the correlation of one or more decision points in the workflow with a successful outcome for the determined intent, wherein providing to the customer making the customer contact the correlation of one or more decision points in the workflow with a successful outcome for the determined intent comprises providing a graphical representation of a decision tree representing the decision points in the workflows and an indication of the correlation of the decision points with the successful outcome for the determined intent; and
receiving an indication of the selected one or more of the plurality of workflows from the customer.

19. The non-transitory, computer-readable memory of claim 18, wherein selecting the one or more of the plurality of workflows in response to the received customer contact based on the correlation of each decision point in the workflow with a successful outcome for the determined intent of the received customer contact further comprises:

providing to an agent handling the customer contact the correlation of one or more decision points in the workflow with a successful outcome for the determined intent, wherein providing to the agent handling the customer contact the correlation of one or more decision points in the workflow with a successful outcome for the determined intent comprises providing a graphical representation of a decision tree representing the decision points in the workflows and an indication of the correlation of the decision points with the successful outcome for the determined intent; and receiving an indication of the selected one or more of the plurality of workflows from the agent.

20. The non-transitory, computer-readable memory of claim 18, wherein selecting the one or more of the plurality of workflows in response to the received customer contact comprises executing a workflow to select the one or more of the plurality of workflows based on the correlation of each decision point in the workflow with a successful outcome for the determined intent of the received customer contact.

\* \* \* \* \*

UNITED STATES PATENT AND TRADEMARK OFFICE
CERTIFICATE OF CORRECTION

Page 1 of 2

PATENT NO. : 11,151,577 B2
APPLICATION NO. : 14/263168
DATED : October 19, 2021
INVENTOR(S) : Chan et al.

It is certified that error appears in the above-identified patent and that said Letters Patent is hereby corrected as shown below:

In the Drawings

On sheet 3 of 7, in FIG. 3, under Reference Numeral 332, Line 3, delete "SUB PROCESSING" and insert -- SUB-PROCESSING --, therefor.

On sheet 3 of 7, in FIG. 3, under Reference Numeral 334, Line 3, delete "SUB PROCESSING" and insert -- SUB-PROCESSING --, therefor.

In the Specification

In Column 2, Lines 45-52, delete "Providing to the agent handling the customer contact the correlation of one or more decision points in the workflow with a successful outcome for the determined intent can comprise, for example, providing a graphical representation of a decision tree representing the decision points in the workflows and an indication of the correlation of the decision points with the successful outcome for the determined intent." and insert the same on Column 2, Line 44 as a continuation of the same paragraph.

In Column 5, Lines 29-38, delete "Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting." and insert the same on Column 5, Line 28 as a continuation of the same paragraph.

In Column 5, Line 47, delete "Blackberry®," and insert -- BlackBerry®, --, therefor.

In Column 6, Line 13, delete "infra-red" and insert -- infrared --, therefor.

In Column 6, Line 15, after "Electronics" insert -- Engineers --.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,151,577 B2

In Column 19, Lines 1-8, delete "Providing to the customer making the customer contact the correlation of one or more decision points in the workflow with a successful outcome for the determined intent can comprise, in some cases, providing a graphical representation of a decision tree representing the decision points in the workflows and an indication of the correlation of the decision points with the successful outcome for the determined intent." and insert the same on Column 18, Line 67 as a continuation of the same paragraph.

In the Claims

In Column 22, Line 46, in Claim 10, after "branch" delete "selected".

In Column 24, Line 27, in Claim 16, after "branch" delete "selected".